United States Patent [19]

Itoh

[11] 4,363,948
[45] Dec. 14, 1982

[54] METHOD OF ELECTRICALLY CUTTING MATERIALS WITH A WIRE-SHAPED ELECTRODE AND APPARATUS FOR PRACTICING THE SAME

[75] Inventor: Teturoh Itoh, Aichi, Japan

[73] Assignee: Mitsubishi Denki Kabushiki Kaisha, Tokyo, Japan

[21] Appl. No.: 85,828

[22] Filed: Oct. 17, 1979

[30] Foreign Application Priority Data

Mar. 13, 1979 [JP] Japan ................................. 54-29168

[51] Int. Cl.$^3$ .............................................. B23P 1/02
[52] U.S. Cl. ................................ 219/69 W; 219/69 P
[58] Field of Search ............... 219/69 W, 69 P, 69 C, 219/69 M

[56] References Cited

U.S. PATENT DOCUMENTS

| | | | |
|---|---|---|---|
| 3,731,044 | 5/1973 | Ullmann et al. | 219/69 W |
| 3,809,848 | 5/1974 | Bell, Jr. | 219/69 P |
| 3,974,357 | 8/1976 | Saito et al. | 219/69 P |
| 4,081,652 | 3/1978 | Jänicke et al. | 219/69 M |

Primary Examiner—C. C. Shaw
Attorney, Agent, or Firm—Sughrue, Mion, Zinn, Macpeak & Seas

[57] ABSTRACT

A material is cut along straight lines and curved lines into a tapered configuration with a wire-shaped electrode according to an electric discharge type cutting method or an electrolysis type cutting method. When the straight cutting operation is shifted to the curved cutting operation, the pulse width of a pulsive voltage applied across the work piece to be cut and the wire-shaped electrode is decreased, or the pulse interval thereof is increased, or the open voltage is reduced, to decrease the electric energy applied to the work piece. Accordingly, the width of a groove cut in a portion of the work piece where the radius of curvature is minimum in the curved cutting operation becomes equal to that in the straight cutting operation. An apparatus for practicing the cutting method is also disclosed.

3 Claims, 13 Drawing Figures

METHOD OF ELECTRICALLY CUTTING MATERIALS WITH A WIRE-SHAPED ELECTRODE AND APPARATUS FOR PRACTICING THE SAME

BACKGROUND OF THE INVENTION

1. Field of the Invention

This invention relates to a method of electrically cutting a work piece by supplying electric current through a working liquid filling a gap formed between a wire-shaped electrode and a work piece to cut the latter as in the case of a fret saw with control of the cutting width. The invention is intended to provide an electrically cutting method which is effective especially in the so-called "taper-cutting" of a solid material to give a tapered cut surface thereto.

2. Description of the Prior Art

FIG. 1 shows a typical example of the conventional electric discharge type taper-cutting apparatus using a wire-shaped electrode.

A material 1 to be cut is placed on a table 3 which is driven in the directions of the arrows X and Y by an X-axis drive motor 4 and a Y-axis drive motor 5, respectively.

A wire electrode 2 is supplied from a wire supplying reel 7 and is taken up on a wire winding reel 12 through a tension roller 8, a current supplying member 9, an upper wire guide 10 and a lower wire guide 11. An x-axis drive motor 14 and a y-axis drive motor 15 are provided to move the wire guide 10 in the directions of the arrows x and y, respectively, so that the running direction of the wire electrode 2 is changed with respect to the lower wire guide 11. A cutting electric power is supplied by a power supply unit 16 through the workpiece 1, the wire electrode 2 and a current supply member 9. A suitable dielectric liquid (not shown) is continuously supplied through the gap between the wire electrode 2 and the material 1 in the conventional manner. That is, the dielectric liquid flows in the gap between the wire electrode 2 and the work piece 2 at all times during the cutting operation.

A control device 20 is provided to control the X-axis drive motor 4 and the Y-axis drive motor 5 of the table 3 and the x-axis drive motor 14 and the y-axis drive motor 15 of the wire guide 10 so that the work piece 1 is cut into a desired configuration. The control device 20 may comprise a profile control device, an N/C device and a computer.

FIG. 2 shows the case where the work piece 1 is to be cut into a die 1A by the apparatus shown in FIG. 1. The lower surface of the die 1A is a cutting edge, and the upper surface is larger than the lower surface as much as the peripheral portion of the upper surface the width of which is indicated by r. If the material 1 has a thickness t, then the taper angle in cutting the material 1, i.e., the inclination angle $\theta$ of the wire electrode 2 is:

$$\theta = \tan^{-1} r/t \qquad (1)$$

Thus, the wire electrode 2 is inclined through the angle $\theta$ in a vertical plane perpendicular to the working surface by moving the upper end portion of the wire electrode outwardly. In other words, it is necessary to move the upper wire guide 10 by means of the x-axis drive motor 14 and the y-axis drive motor 15 so that the wire electrode 2 is maintained at the angle $\theta$ at all times.

In order to maintain this condition, the inclination of the wire electrode 2 is maintained unchanged while the straight portion is cut. However, when the corner portion or curved portion is cut, it is necessary to vary the direction of inclination as the cutting is advanced. When the wire electrode 2 reaches the point B on the upper surface of the work piece 1 and accordingly the point b on the lower surface (the cutting operation effected until the wire electrode 2 reaches the points B and b will be referred to as "a cutting operation in a first cutting mode" when applicable), then the cutting operation of the curved portion will be started (the cutting operation of the curved portion will be referred to as "a cutting operation in a second cutting mode" when applicable). In the cutting of the curved portion, while the locus of the wire electrode is inscribed from the point b to the point c on the lower surface of the material, the locus of the wire electrode must advance from the point B to the point C on the upper surface. FIG. 3 is an enlarged view showing the movement of the wire electrode 2 which is effected in cutting the curved portion. As is apparent from FIG. 3, the wire electrode 2 is moved along the surface of a circular cone having its vertex a. If, in this connection, the rotational radii of the cutting portion of the wire electrode are represented by Rd in the locus on the lower surface of the material 1 and Ru in the locus on the upper surface, then $$Ru = Rd + r = Rd + t \cdot \tan\theta \qquad (2)$$

Accordingly, the relative speed of the wire electrode and the work piece in the upper surface is different from that in the lower surface.

Now, let's consider the width of a groove which is made by the cutting. In the upper surface, the groove width is maintained equal to that in the straight portion up to the point B, because the cutting is carried out substantially with the upper limit of the cutting capability similar as in the straight cutting operation. On the other hand, in the lower surface, the relative speed becomes lower than that in the straight cutting operation, and accordingly the groove width is increased as shown in FIG. 4.

Especially in the case where a work piece is cut into a die as described above, the accuracy of its cutting edge is lowered. This is one of the serious disadvantages accompanying the conventional electrically taper-cutting method.

SUMMARY OF THE INVENTION

Accordingly, a primary object of this invention is to provide a novel method of electrically cutting a work piece with a wire-shaped electrode, which can control the width of groove cut therein during the cutting operation, and an apparatus for practicing the method.

Another object of the invention is to provide a novel method of electrically cutting a work piece with a wire-shaped electrode in which all of the above-described difficulties accompanying the conventional method have been eliminated, and an apparatus for practicing the method.

According to one aspect of the present invention, a method of electrically cutting a work piece with a wire-shaped electrode in which electric current flows through a working liquid supplied to the working gap between the wire-shaped electrode and the work piece to be cut, and the wire-shaped electrode and the work piece are moved relative to each other to allow the wire-shaped electrode to cut the work piece into a desired shape, is provided which is characterized by that electric energy supplied to the working gap is controlled at a predetermined time instant in the cutting operation so that the width of a groove cut therein is controlled.

According to another aspect of the present invention, an apparatus for electrically cutting a work piece with a wire-shaped electrode in which electric current flows through a working liquid supplied to the working gap formed between the wire-shaped electrode and the work piece to electrically cut the latter and, in correspondence to the cutting operation, the wire-shaped electrode and the work piece are relatively moved in a predetermined manner to cut the work piece into a desired configuration, is provided, which is characterized by a provision of a power supply unit for applying the electric current to the wire-shaped electrode and the work pieces. The power supply unit includes an electric source, a switching circuit connected to the electric source and a control circuit for controlling the operation of the switching circuit so that electric energy supplied to the working gap is controlled at a predetermined time instant in cutting the work piece.

According to another aspect of the invention, an apparatus for electrically cutting a work piece with a wire-shaped electrode in which electric current flows through a working liquid supplied to the working gap formed between the wire-shaped electrode and the work piece and, in correspondence to the cutting operation, the wire-shaped electrode and the work piece are relatively moved in a predetermined manner to cut the work piece into a desired configuration is provided which is characterized by a power supply unit for supplying the electric current to the wire-shaped electrode and the work piece comprising an electric source, a capacitor whose terminals are connected to the wire-shaped electrode and the work piece, respectively, and a voltage control circuit connected to the electric source to charge the capacitor, the output voltage of the voltage control circuit being varied so that electric energy supplied to the working gap is controlled at a predetermined time instant in cutting the work piece, thereby to vary the voltage charging the capacitor.

These and other features of the invention will become more apparent from the following detailed description and the appended claims when read in conjunction with the accompanying drawings, in which like parts are designated by like reference numerals or characters.

DESCRIPTION OF THE PREFERRED EMBODIMENTS

Figure 5A:
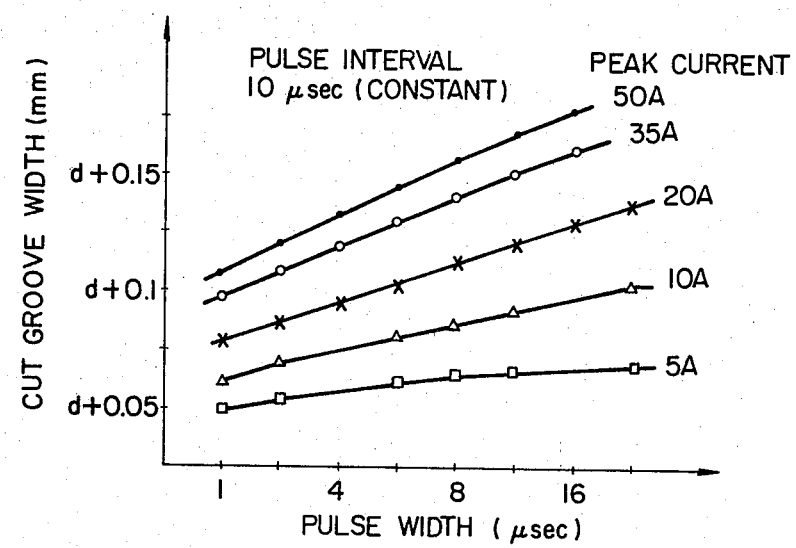
FIG. 5(a) is a graphical representation indicating the relation between the pulse width of a pulse voltage applied between a wire electrode and a work piece to be cut and a width of a groove to be cut with peak current values as parameters, on which are based the method of electrically cutting a work piece with a wire electrode according to the invention and the apparatus for practicing the method.
Figure 5B:
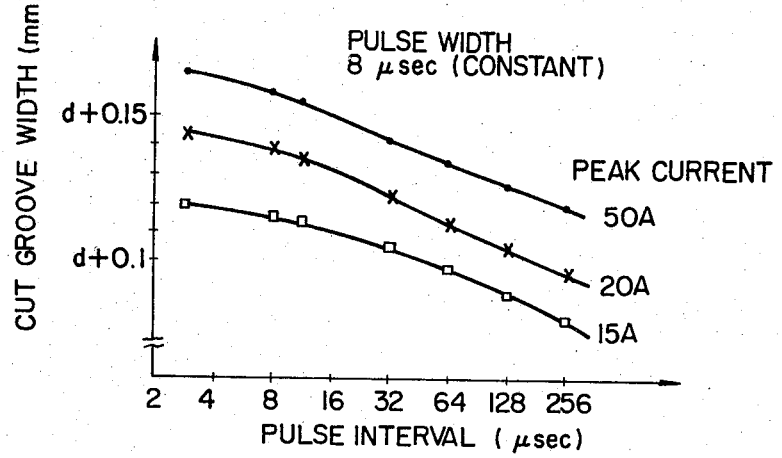
FIG. 5(b) is a graphical representation indicating the relation between the pulse interval of the pulse voltage applied between the wire electrode and the work piece to be cut and a width of the cut groove with peak current values as parameters, on which are based the method and the apparatus according to the invention.
Figure 5C:
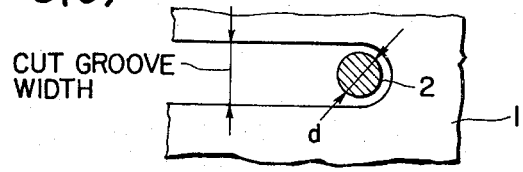
FIG. 5(c) is a plan view showing the width of the groove cut.

FIGS. 5(a) and 5(b) show examples of the relations between groove widths, pulse widths and pulse intervals with peak currents as parameters in an electric discharge method of cutting a work piece with a wire electrode. A work piece 1 to be cut is of SKD-11 which contains, according to the Japan Industrial Standard, C 1.4–1.6%, Si less than 0.4%, Mn less than 0.6%, P less than 0.03%, S less than 0.03%, Cr 11.0–13.0%, Mo 0.8–1.2%, V 0.2–0.5%, and Fe remaining, and is 60 mm in thickness. In FIG. 5(a), the pulse interval and the relative speed between the wire electrode and the work piece 1 are maintained unchanged (the relative speed being 0.5 mm/sec) and the pulse width is changed. in FIG. 5(b), the pulse width and the relative speed are maintained constant, and the pulse interval is changed. FIG. 5(c) illustrates the width of a groove cut thereby.

Figure 1:
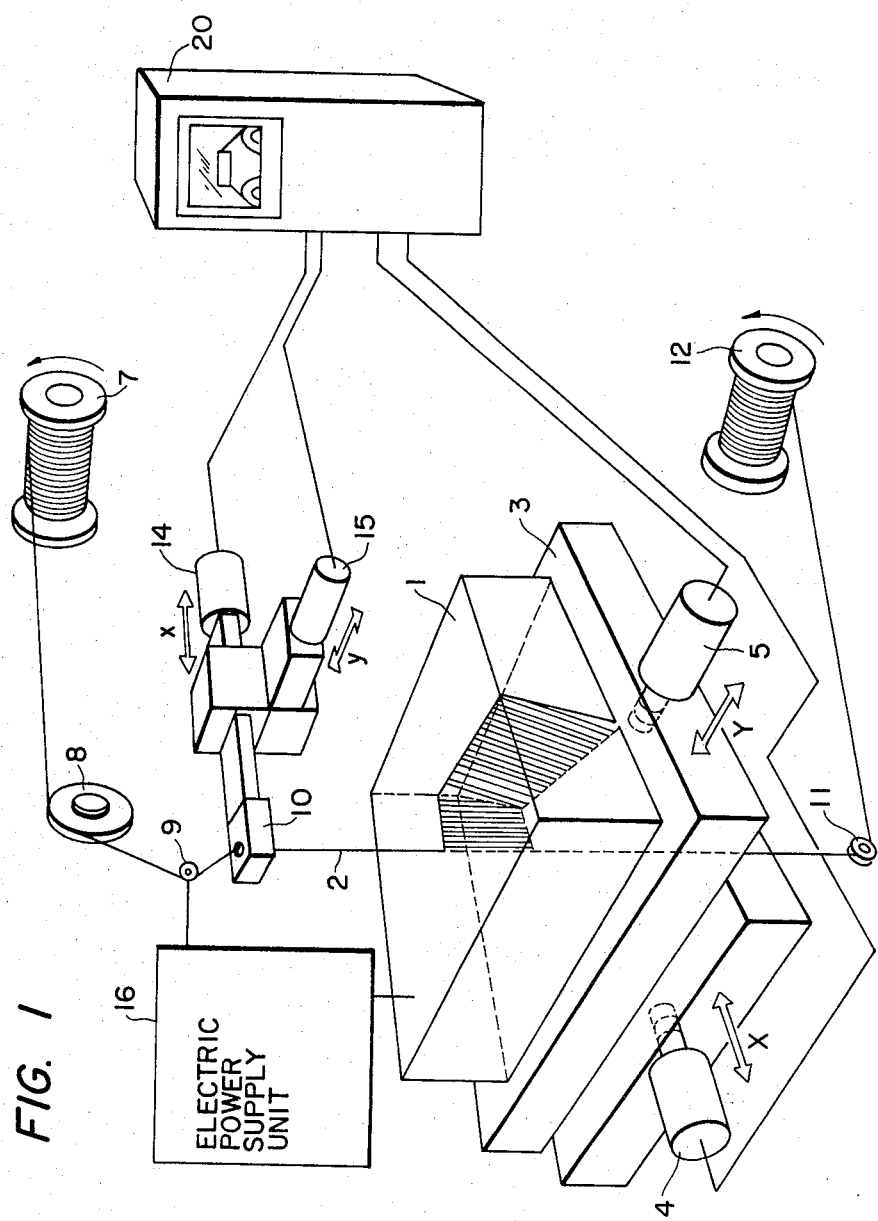
FIG. 1 is an explanatory illustration of a typical example of the conventional apparatus for electrically cutting a work piece with a wire electrode.
Figure 2:
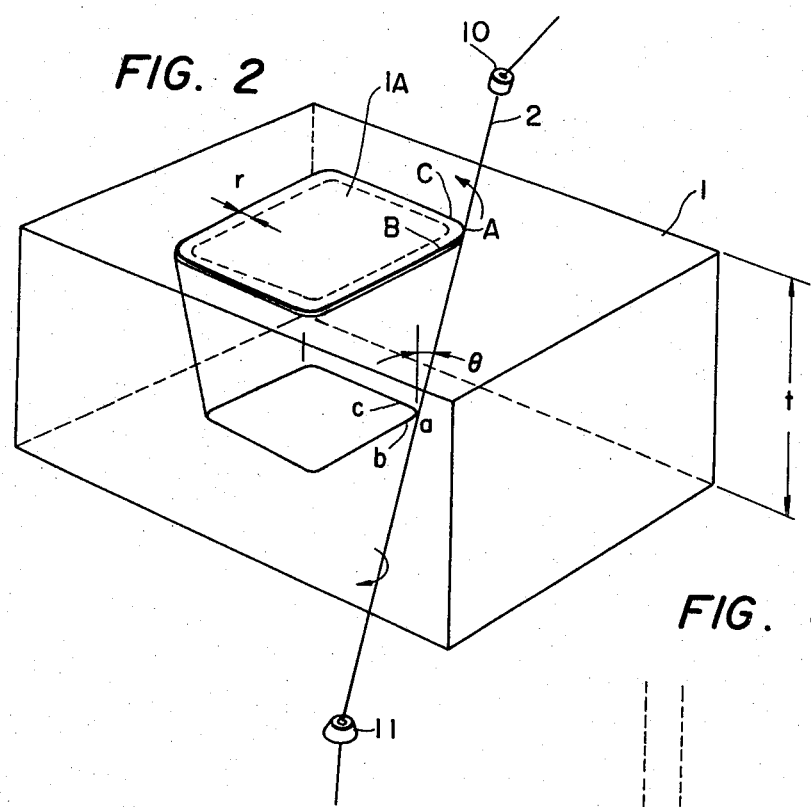
FIG. 2 is a perspective view showing one example of a work piece to be cut, which is being cut by the apparatus shown in FIG. 1.
Figure 4:
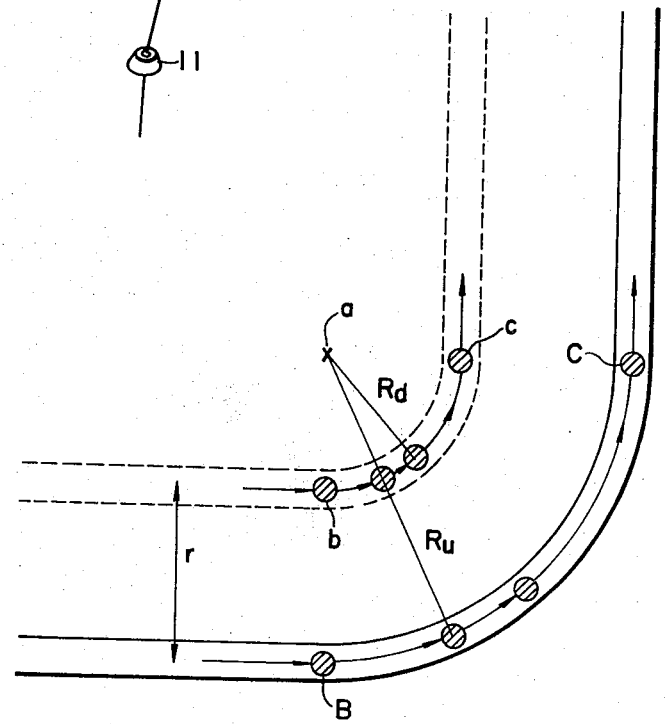
FIG. 4 is a plan view of the curved portion shown in FIG. 3, for a description of the cutting of the curved portion.
Figure 3:
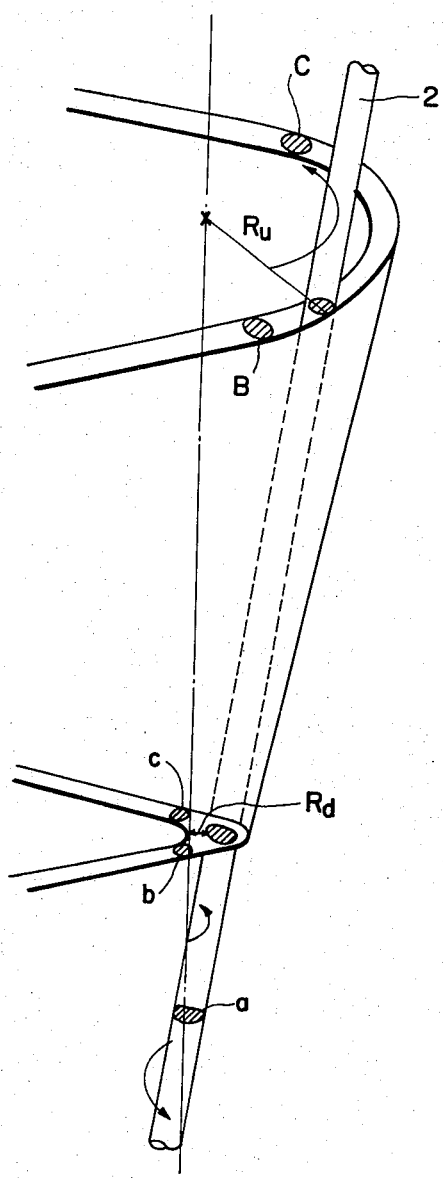
FIG. 3 is an enlarged perspective view for an explanation of the cutting of a curved portion shown in FIG. 2.

In order to cut the work piece into a configuration as shown in FIG. 3, it is apparent from FIG. 5 that it is necessary to obtain the width of a groove cut in the straight portion from the cutting conditions thereof in FIG. 5, and then to obtain the electric energy, i.e., the peak current and the pulse width, or the peak current and the pulse interval with which the same cut groove width as that in the straight portion is obtained in the curved portion with the relative speed of the wire electrode 2 and the work piece 1 in the lower surface, so that the electric energy is decreased to the value thus obtained. In this case, the width of the curved groove is smaller than that of the straight portion in the upper surface, because the relative speed in the curved portion is higher than that in the straight portion. However, in the case of the die, the accuracy of the curved portion may not be so high. If it is required to increase the accuracy of the curved portion, then the curved portion can be additionally machined later because it still has a margin owing to the narrow groove width.

A difficulty may occur that when the electric energy is reduced so that the groove width of the curved portion becomes equal to that of the straight portion in the lower surface, the wire electrode and the work piece may be short-circuited because of the high relative speed described above, which makes it impossible to cut the work piece. However, the difficulty can be readily eliminated by employing a method such that, as is clear from FIG. 5 and its description above, the above-described relative speed in the curved portion is further decreased and the electric energy is also decreased so as to have the same groove width as that of the straight portion.

One example of the various experiments which have been actually conducted will be described as conducive to a full understanding of the invention.

A work piece was cut in such a manner that the groove width of the curved portion was equal to that (0.33 mm) of the straight portion in the upper surface of the work piece 1, i.e., the relative speed of the material and the wire electrode in the curved portion was equal to that (0.5 mm/sec) of the straight portion. As a result, the maximum groove width of the curved portion in the lower surface was 0.38 mm. In this experiment, the relative speed in the lower surface was 0.3 mm/sec, the width of the pulse voltage applied to the discharge gap was 10 μsec, the pulse interval thereof was 2 μsec, the open voltage was 150 V, the peak current was 25 A, the taper angle $\theta$ was 1.3 degrees, the work piece 1 was of SKD-11, the thickness thereof was 60 mm, the wire electrode was of copper and had a diameter (d) of 0.2 mm, and the working liquid was a water having a specific resistance of 20 K$\Omega$ cm.

In view of the foregoing result, another work piece was cut, in which the groove width of the curved portion was equal to the groove width (0.33 mm) of the straight portion in the lower surface, the pulse width was decreased to 2 μsec in cutting the curved portion by referring to FIG. 5(a) and the remaining conditions were the same as those in the above-described case. In this case, the groove width of the straight portion was equal to that of the curved portion in the lower surface. However, the groove width in the upper surface of the work piece 1 was 0.29 mm, and the work piece 1 and the wire electrode 2 were short-circuited in the upper surface.

In order to eliminate the short-circuit phenomenon, another work piece was cut in which, referring to FIG. 5(a), the relative speed of the work piece 1 and the wire electrode 2 was decreased to 0.1 mm/sec, the pulse width was further decreased to 0.5 μsec so that the groove width of the curved portion was equal to that of the straight portion in the lower surface, and the remaining conditions were the same as those in the above-described case. The groove width of the curved portion was equal to that (0.33 mm) of the straight portion in the lower surface of the work piece 1. No short-circuiting was caused between the work piece 1 and the wire electrode 2 in the upper surface. In this case, the relative speed of the material 1 and the wire electrode 2 in the curved portion of the upper surface was 0.25 mm/sec, and the groove width was 0.28 mm.

The above-described application of electric energy may be manually controlled.

Shown in FIGS. 6 through 9 is one example of an automatic control device adapted to automatically control the electric energy. The control device 20 comprises an N/C device 22, a computer 23 and a multiplexer 24. The control device 20 drives the drive motors 4, 5, 14 and 15 with the aid of instructions from a magnetic tape 21 so that the table 3 and the upper wire guide 10 are suitably moved to cut the work piece into a desired configuration. For instance, when the cutting operation is advanced to the point B-b in FIG. 3, the computer 23 in the control device 20 calculates the electric energy necessary for cutting the curved portion by using data stored therein, the electric energy is converted into electrical signals by the N/C device 22 and the multiplexer 24, and the electrical signals thus obtained are outputted as instruction signals, as a result of which the electric energy supplied to the gap between the work piece 1 to be cut and the wire electrode 2 is controlled to a desired value.

Figure 7:
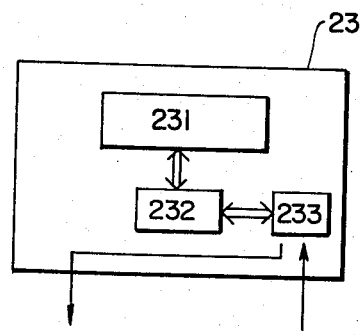
FIG. 7 is a block diagram showing various circuit components in a computer shown in FIG. 6.

As well known in the art, the computer 23 (FIG. 7) comprises a main memory circuit 231, an operation circuit 232 and an input and output control circuit 233. The computer 23 carries out numerical calculation processes such as arc interpolation calculations, straight line interpolation calculations, and conversions of decimal numbers into binary numbers according to the data supplied thereto. In FIG. 7, the arrows show the flow of such data.

Figure 8:
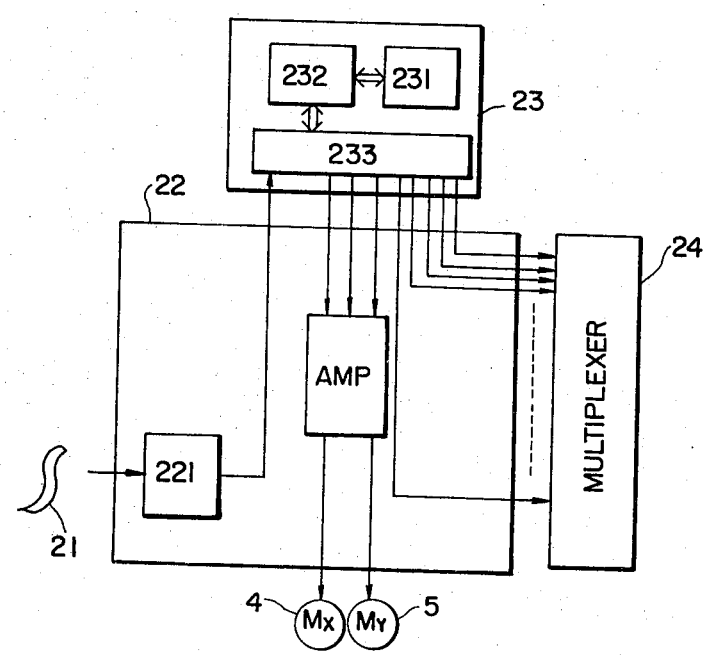
FIG. 8 is a block diagram showing various circuits in an N/C device shown in FIG. 6.

As shown in FIG. 8, the N/C device 22 functions to read the program data of the tape 21 by a tape reader 221, to supply the read data to the input-output control circuit 233 of the computer 23 so that the program data is processed by the computer 23 to form signals which are necessary to control the cutting apparatus and to amplify the resultant signals by an X- and Y-axis drive amplifiers AMP thereof to drive the motors 4 and 5 for the X-Y table, or to switch the electrical conditions.

Figure 9:
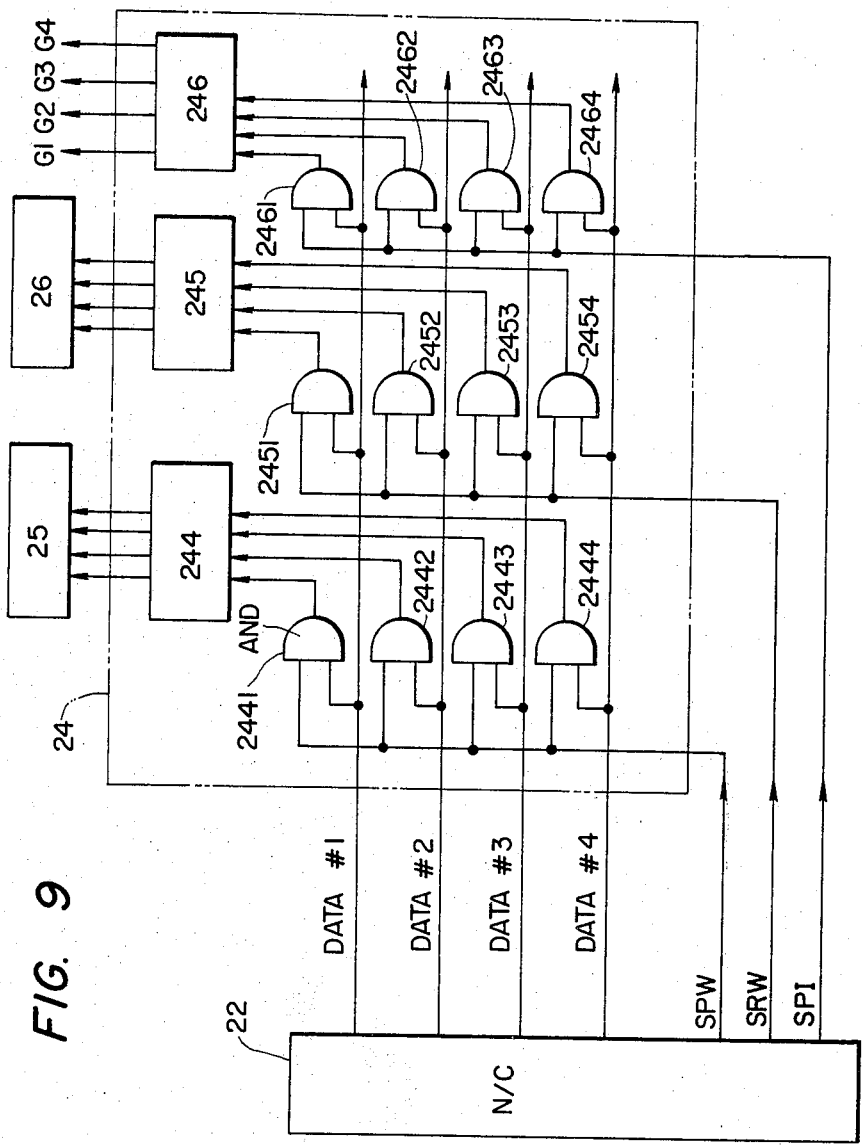
FIG. 9 is also a block diagram showing various circuit components in a multiplexer shown in FIG. 6.

The multiplexer 24 in FIG. 9 comprises AND gates 2441, 2442, 2443, 2444, 2451, 2452, 2453, 2454, 2461, 2462, 2463 and 2464, so that the output data #1 through #4 of the N/C device are stored in and outputted by temporary latch circuits 244, 245 and 246 with the aid of selection signals SPW, SRW and SPI of pulse width, pulse interval and peak current.

The power supply unit 16 comprises a DC power source 17, current limiting resistors R1 through R4 and a switching circuit TrC having switching elements Tr1 through Tr4 which are adapted to switch these resistors and carry out the switching of the pulse circuit. The peak value of the pulse current can be changed to a desired value by the selective on-off control of the switching elements Tr1 through Tr4 by means of gate circuits G1 through G4. A pulse width and pulse interval setting pulse generator, or a control circuit PRWCC, comprises first and second presettable counters 25 and 26, a J-K flip-flop 27, an OR gate G5, AND gates G6 and G7, and an oscillator OSC. The preset values of the presettable counters 25 and 26 are controlled by the output of the multiplexer 24 to control the pulse width and the pulse interval. For instance, it is assumed that, in carrying out the cutting operation as shown in FIGS. 1 through 4, a value "6" is applied by the multiplexer 24 to the counter 25 for the straight cutting operation. (In this case, the output Q of the flip-flop 27 is assumed at a logical level "1.") Then the clock pulse from the oscillator OSC is applied through the gate G6) to the first presettable counter 25. When the count value of the counter 25 reaches a value "6," then the counter 25 outputs a coincidence signal to the OR gate G5. As a result, a pulse is applied to the clock terminal T of the J-K flip-flop to change the state of the J-K flip-flop whereby the output Q thereof is set to a logic level "0." Accordingly, the gate G7 is opened, and the second presettable counter 26 for setting the pulse interval starts its counting operation. When the count value of the counter 26 reaches the predetermined output value of the multiplexer 24, the first counter 26 for setting the pulse width starts its operation again. Thus, the pulse width and the pulse interval, and the peak current value are controlled to the predetermined values.

When the wire electrode 2 reaches the change points B and b, then the multiplexer 24 outputs a numerical value "0010" according to the instruction preset in the tape 21, and the set value of the first presettable counter 25 is decreased to "2." In other words, the set value of the counter 25 in the straight cutting operation (in the first mode) is lower than that of the counter 25 in the curved cutting operation (in the second mode). Accordingly, the time interval which elapses from the time instant that the first presettable counter 25 receives the signal from the gate G5 until the counter 25 provides the output to the gate G6 in the curve cutting operation is shorter than that in the straight cutting operation. Accordingly, the time that the output Q of the flip-flop 27 is at "1" is shorter, and the period of time that the switching circuit TrC is closed in the curve cutting operation is shorter than that in the straight cutting operation. That is, the pulse width of the pulse voltage applied between the work piece 1 and the wire electrode 2 becomes smaller. In the curve cutting operation, the drive signals applied to the motors for the table 3, namely, the X-axis motor and the Y-axis motor by the amplifier AMP in the N/C device are so changed that the speed of movement of the table effected by the two motors 4 and 5, i.e., the relative speed of the material 1 and the wire electrode 2 is decreased. Furthermore, various instructions are stored in the tape 21 in advance to satisfy the conditions that control is so made that the cut groove width of the curved portion is equal to that of the straight portion in the lower surface to the work piece 1 as described above, and the pulse width and the table 3 feeding speed are such that the work piece 1 and the wire electrode 2 are not short-circuited. The control is started at the change points B and b where the straight cutting operation is switched over to the curve cutting operation and ended at the change points C and c where the curve cutting operation is changed to the straight cutting operation again. In the straight cutting operation after the change points C and c, the same control as that in the straight cutting operation which was effected until the wire electrode reaches the change points B and b is carried out.

Instead of the control of the pulse width as described above, the control of the pulse interval may be carried out. In this case, as is apparent from FIG. 5(b), the pulse interval in the curve cutting operation is made longer than that in the straight cutting operation. That is, the multiplexer 24 outputs a numerical value, for instance, six (6) in decimal notation (corresponding to "0110" in binary rotation) to set the count setting value of the second presettable counter 26 to six in decimal notation. That is, the count setting value in the curved cutting operation is made larger than that in the straight cutting operation.

Figure 6:
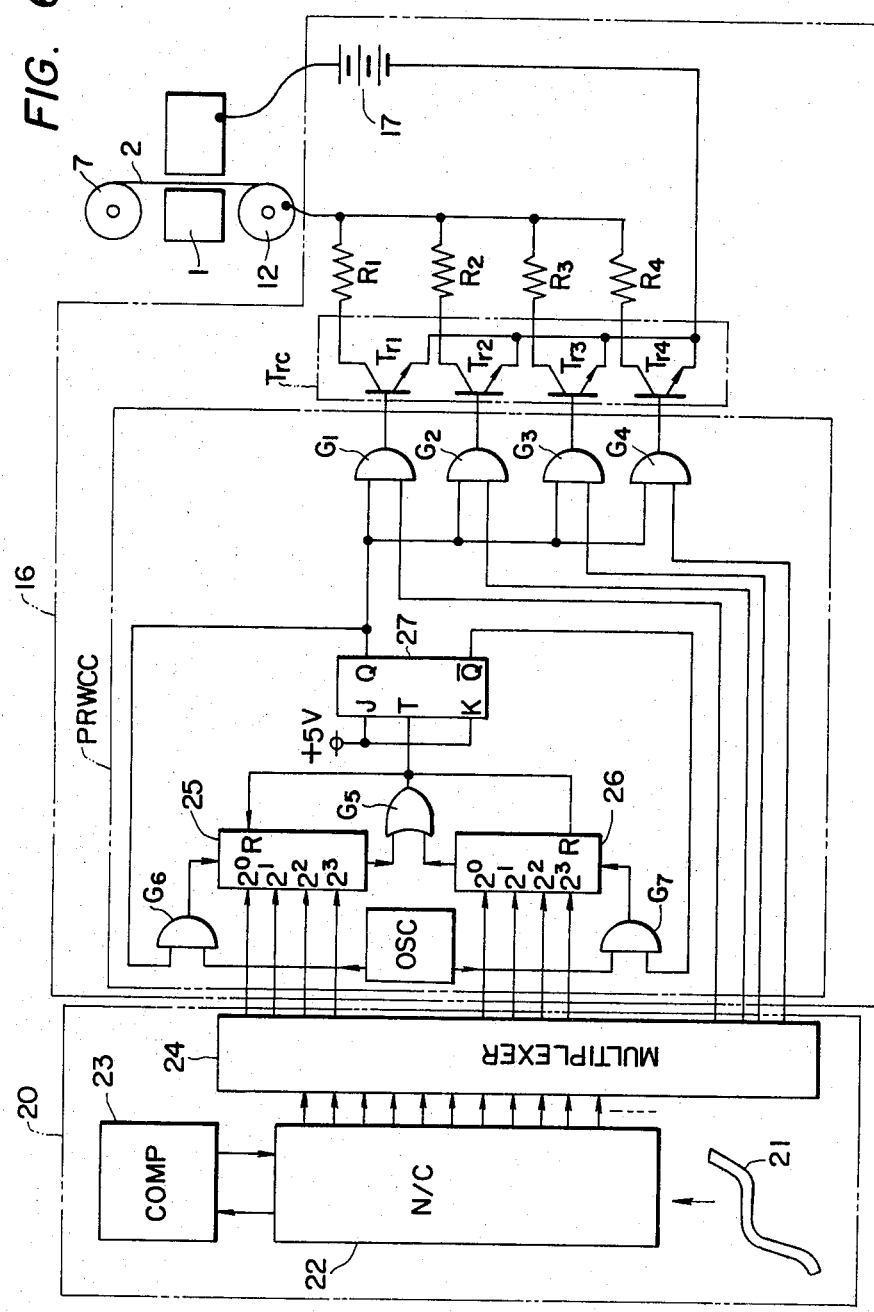
FIG. 6 is a circuit diagram showing one example of the apparatus which practices the method of electrically cutting a work piece with a wire electrode according to the invention.

In the case where the groove width is controlled by controlling the peak current value, the peak current value in the curve cutting operation is made smaller than that in the straight cutting operation. It is assumed that all of the semiconductor switching elements Tr1 through Tr4 shown in FIG. 6 are conductive (on) in the straight cutting operation, that is, in FIG. 9, all of the data #1 through #4 are at "1" and the peak current selection signal SPI is at "1." Then, in the curve cutting operation, the switching elements Tr1 and Tr2 are rendered conductive (on), while the switching elements Tr3 and Tr4 are rendered nonconductive (off) if the data #1 and #2 are at "1" and the data #3 and #4 are at "0" and the peak current selection signal SPI is at "1." Accordingly, all of the current limiting resistors R1 through R4 are parallel-connected in the straight cutting operation. On the other hand, in the curve cutting operation, only the resistors R1 and R2 are parallel-connected. Therefore, the total current limiting resistance in the curve cutting operation is higher than that in the straight cutting operation, and accordingly the peak current value is decreased in the curve cutting operation.

Selection of the above-described pulse width control, the pulse interval control and peak current value control and combination of them depend on various factors such as the material and the thickness of the work piece 1, the taper angle, the roughness of the cut surface, and the dimensional accuracy. At any rate, the tape 21 should be prepared so that the work piece can be cut in accordance with the above-described requirements. According to the data stored in the tape 21 thus prepared, at least one of the pulse width selection signal SPW, pulse interval selection signal SRW and peak current selection signal SPI is raised to "1," and at least one of data #1 through #4 is raised to "1."

As is apparent from the above description, in the above-described embodiment of the invention, even in the case where the relative speed of the work piece 1 and the wire electrode 2 in the upper surface must be made different from that in the lower surface due to the difference between the length of the cutting path in the upper surface and that in the lower surface, the electric energy supplied to the cutting apparatus can be readily controlled according to the data set therein and, accordingly, the groove width of a portion of the work piece, i.e., a predetermined portion thereof can be controlled as desired.

Figure 10:
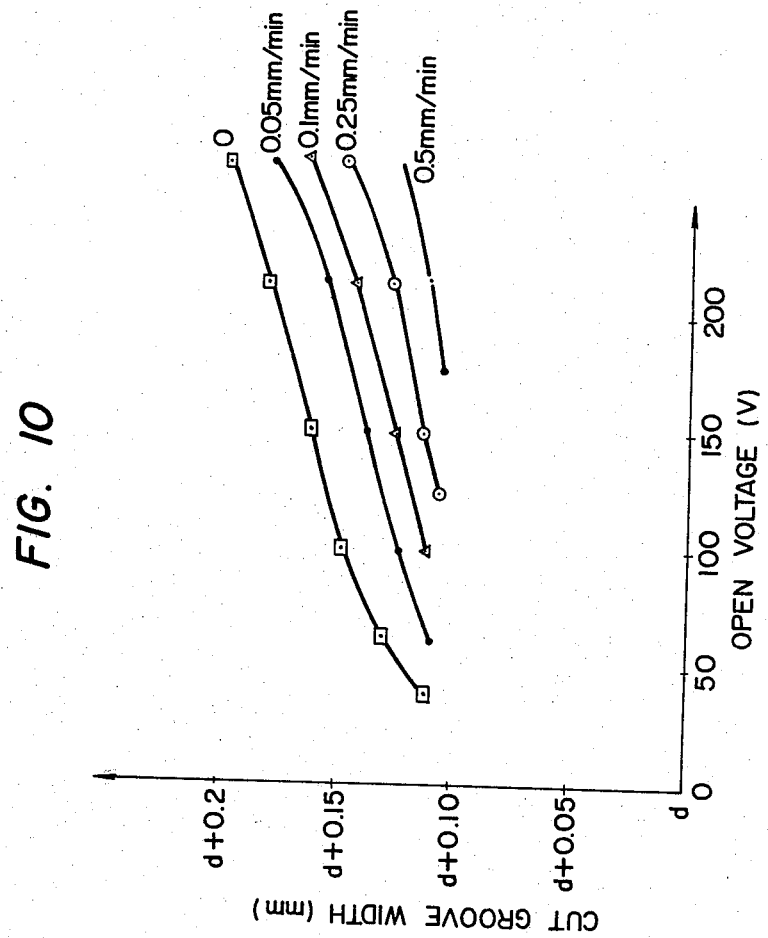
FIG. 10 is a graphical representation indicating the relation between the open pulse voltage applied between a wire electrode and a work piece to be cut and a groove width cut thereby with the relative speeds of the wire electrode and the work piece as parameters, on which another example of the method and apparatus according to the invention is based.

FIG. 10 is a graphical representation indicating the relations between open voltages and groove widths with the various relative speeds of the work piece and the wire electrode as parameters. In this case, the work piece 1 is of SKD-11 and is 60 mm in thickness, and the capacitance of a discharge capacitor 19 (FIG. 11) described later is 0.6 $\mu$F.

In order to cut a material into a configuration as shown in FIG. 3, it is apparent from FIG. 10 that it is necessary to obtain the width of a groove cut in the straight portion similarly as in the case of FIGS. 5(a) and 5(b), by using FIG. 10 and then to obtain an open voltage with which the same groove width as that in the straight portion is obtained in the curved portion with the relative speed of the wire electrode 2 and the work piece 1 in the lower surface, so that the open voltage, i.e., the electric energy is reduced to the value thus obtained. In this case, the groove width of the curved portion is smaller than that of the straight portion in the upper surface similarly as in the case of FIGS. 5(a) and 5(b). However, in the case of a die, the accuracy of the curved portion may not be so high and if it is required to increase the accuracy of the curved portion the curve portion can be additionally cut later because it still has a margin owing to the narrow groove width, as mentioned before.

A difficulty may be caused that when the open voltage is reduced so that the groove width of the curved portion is equal to that of the straight portion in the lower surface, the wire electrode and the work piece may be short-circuited similarly as in the above-described case, which makes it impossible to cut the work piece. However, the difficulty can be readily eliminated by employing a method such that, as is clear from FIG. 10 and its description above, the above-described relative speed in the curved portion of the lower surface is further decreased, and the open voltage is also decreased so that the groove width of the curved portion is equal to that of the straight portion.

Figure 11:
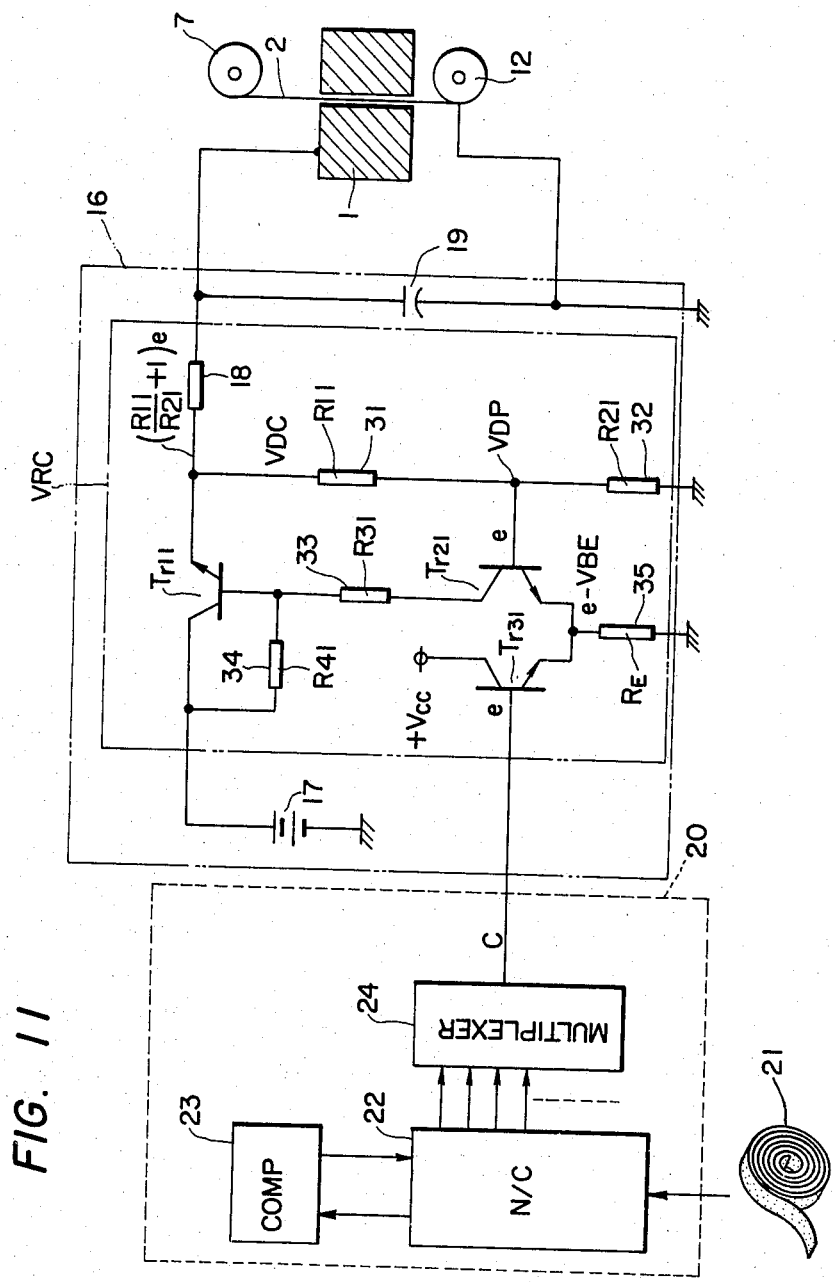
FIG. 11 is a circuit diagram showing the apparatus by which the data in FIG. 10 are obtained.

The control of the open voltage can be manually achieved. Shown in FIG. 11 is one example of a control device which automatically achieve the control of the open voltage. The control device 20 comprises an N/C device 22, a computer 23; and a digital-to-analog (D/A) converter 24. The control device 20 drives the drive motors 4, 5, 14 and 15 with the aid of instructions from the magnetic tape 21 so that the table 3 and the upper wire guide 10 are suitably moved to cut the work piece into a desired configuration. For instance, when the cutting operation is advanced to the point B-b in FIG. 3, the computer 23 calculates the open voltage which is necessary for cutting the curved portion by using the data stored therein. The digital signal is applied through the N/C device 22 to the D/A converter, where it is converted into an analog signal e, which is outputted as an instruction signal by the control device 20.

A power supply unit 16 comprises a DC electric source 17, a discharge circuit made up of a limiting resistor 18 and a capacitor 19 and a voltage control circuit VRC constituted by connecting a transistor $TR_1$, a first transistor $TR_2$ and a second transistor $TR_1$ in the main circuit, and resistors 31 through 35 whose resistances are $R_1$, $R_2$, $R_3$, $R_4$ and $R_E$, respectively, as shown in FIG. 11.

The operation of the circuit shown in FIG. 11 will be described. When an instruction signal, or a voltage e is applied to the base of the transistor $Tr_3$, then the voltage at the emitter thereof is $e - V_{BE3}$ ($V_{BE3}$ being the base-emitter voltage of the transistor $Tr_3$), and the voltage at the emitter of the transistor $Tr_2$ is also $e - V_{BE3}$ because the voltage at the emitter of the transistor $Tr_2$ is equal to the voltage at the emitter of the transistor $Tr_3$. In general, each of the base-emitter voltage $V_{BE3}$ of the transistor $Tr_3$ and the base-emitter voltage $V_{BE2}$ of the transistor $Tr_2$ is equal to about 0.6 V. Therefore, the transistor $Tr_1$ is so controlled that the base voltage $V_{B2}$ of the transistor $Tr_2$ is $e - V_{BE3} + V_{BE2} \approx e$, and accordingly, the potential at the voltage division point VDP of a voltage division circuit VDC made up of the resistors 31 and 32 is also e. As a result, the emitter voltage of the transistor $V_{E1}$ of the transistor $Tr_1$ is:

$$V_{E1} = \left(\frac{R_1}{R_2} + 1\right) e$$

The emitter voltage $V_{E1}$ of the transistor $Tr_1$ is the open voltage of the power supply unit 16 and is proportional to the instruction voltage e as described above. Thus, the emitter voltage $V_{E1}$ is controlled to a predetermined release voltage.

As is apparent from FIGS. 10 ad 11, also in the embodiment shown in FIG. 11, even in the case where the relative speed of the material 1 and the wire electrode 2 in the upper surface must be made different from that in the lower surface due to the difference between the length of the cutting path in the upper surface and that in the lower surface, the open voltage applied to the cutting apparatus is automatically controlled, and accordingly the cut groove width of a portion of the material, i.e., a predetermined portion thereof can be controlled to a predetermined value, or, if necessary, to a desired different value.

The operation of the circuit shown in FIG. 11 will be described in more detail. In the straight cutting operation, the voltage of the signal e is 5 V, that is, the voltage at the voltage division point VDP is 5 V. Therefore, the cutting operation is carried out with the emitter voltage $V_{E1}$ of the main transistor $Tr_1$, i.e., the open voltage of the power supply unit 16 being 150 V. When the wire electrode 2 reaches the change point B-b, the output of the D/A converter 27, i.e., the voltage e is reduced to 2.5 V in accordance with the instruction stored in the tape 21, and accordingly the voltage at the voltage division point VDP is also decreased to 2.5 V. Therefore, the emitter voltage $V_{E1}$ of the main transistor $Tr_1$, i.e., the open voltage of the power supply unit 16 is decreased to 75 V. During the curved cutting operation, the voltage is maintained at 75 V. When the wire electrode reaches the change point C-c to perform the straight cutting operation again, the voltage is restored to 150 V again. When, in the curved cutting operation, the open voltage of the power supply unit becomes lower than that in the straight cutting operation as described above, then the cut groove width is decreased as is clear from FIG. 10. Accordingly, similarly as in the embodiment shown in FIG. 6, the cut groove width of the curved portion becomes equal to that of the straight portion in the lower surface of the work piece 1. Also in the embodiment shown in FIG. 11, similarly as in the embodiment shown in FIG. 6, it is necessary to make the relative speed of the work piece 1 and wire electrode 2 in the curved cutting operation lower than that in the straight cutting operation so that the work piece 1 and the wire electrode 2 and not short-circuited in the upper surface of the work piece 1.

The apparatus described above may be so programmed that, when a work piece is being electrically cut with the wire electrode being held vertical in an ordinary manner, the width of a groove cut therein can be controlled at a predetermined point.

While the invention has been described with reference to the electric discharge type taper-cutting, it should be noted that the invention is not limited thereto or thereby. That is, the invention is applicable to the case also where a work piece is cut with the wire electrode while an electrolytic liquid being applied to the working gap between the work piece and the wire electrode for electrolysis action. In the electrolysis type cutting operation, the amount of cutting is determined as a function of current density and time and as a function of applied voltage (normally 5 to 15 V) and time. Therefore, the variation of the relative speed of the wire electrode and the work piece to be cut in the electrolysis type cutting affects the width of a groove cut more than that in the electric discharge type cutting. Accordingly, the effect of the invention in the electrolysis type taper-cutting should be highly appreciated.

In the above-described embodiments, the wire is employed as the electrode, however, it should be noted that it is not always necessary that the electrode is a wire, as can be understood from the nature of the present invention. That is, the same effect can be obtained by using a so-called "wire-shaped electrode" such as an electrode which is made of, for instance, a non-flexible rod.

As is apparent from the above description, in the invention, the electric energy applied between the wire electrode and the material to be cut is controlled so that the width of a groove cut therein is controlled at a predetermined time instant using the cutting operation. Accordingly, the curved cutting (or the bent cutting) can be effectively and suitably carried out in a cutting operation according to the taper-cutting method.

What is claimed is:

1. An apparatus for electrically cutting a work piece with a wire-shaped electrode in which electric current is applied to said wire-shaped electrode and said work piece through a working liquid applied to the working gap formed between said wire-shaped electrode and said work piece to electrically cut said work piece, and in correspondence to said cutting operation, said wire-shaped electrode and said work piece are relatively moved in a predetermined manner to cut said work piece into a desired configuration, in which the improvement comprises a power supply unit for applying said electric current to said wire-shaped electrode and said work piece, said power supply unit comprising: digital setting means for setting digital values corresponding to a pulse width, pulse interval and peak current, respectively, of said electric current applied to said wire-shaped electrode and said work piece; a first presettable counter receiving on preset inputs thereof said digital value representing said pulse width; a second presettable counter receiving on preset inputs thereof said digital value representing said pulse interval; a toggle-type flip-flop; an oscillator for producing clock pulses; a first AND gate having a first input coupled to receive said clock pulses, a second input coupled to a Q output of said flip-flop and an output coupled to a clock input of said first presettable counter; a second AND gate having a first input coupled to receive said clock pulses, a second input coupled to a Q output of said flip-flop, and an output coupled to a clock input of said second presettable counter; an OR gate having a first input coupled to a predetermined count output of said first presettable counter, a second input coupled to a predetermined count output of said second presettable counter, and an output coupled to reset inputs of said first and second presettable counters and a clock input of said flip-flop; a plurality of third AND gates, each of said third AND gates having a first input coupled to said Q output of said flip-flop and said third AND gates having second inputs coupled to receive said value representing said peak current; a plurality of current limiting resistors, one of said current limiting resistors being provided for each of said third AND gates; a plurality of switching means, one of said switching means being provided for each of said third AND gates, each of said switching means having a control input coupled to an output of a corresponding one of said third AND gates and a first current-carrying terminal coupled through a corresponding one of said current limiting resistors to a first of said wire-shaped electrode and said work piece; and a DC power source having a first terminal coupled to a second of said wire-shaped electrode and said work piece and a second terminal coupled to a second current-carrying terminal of each of said switching means.

2. An apparatus as claimed in claim 1 wherein said digital value setting means comprises computing means for determining said values representing said pulse width, pulse interval and peak current so that electrical energy is supplied to said working gap at a rate so as to maintain the width of a groove cut in said work piece substantially constant.

3. An apparatus as claimed in claim 2 wherein said computing means is programmed to set said values representing said pulse width, pulse interval and peak current such that said elelctrical energy applied to said working gap is controlled according to the type of cut being made in said work piece, said cutting operation comprising a first cutting mode in a second cutting mode, said first cutting mode being used during times in which a straight cutting operation is effected, and said second cutting mode being used during times in which said work piece is cut into a tapered configuration and a curved cutting operation is effected, said first mode being switched to said second mode at a predetermined time instant occurring at a change point where a straight cutting operation is shifted to a curved cutting operation, wherein said electrical energy applied to said working gap varies in dependence upon the cutting mode used.

* * * * *